US012519260B2

(12) United States Patent
Huang et al.

(10) Patent No.: US 12,519,260 B2
(45) Date of Patent: Jan. 6, 2026

(54) FLOATING CONNECTOR

(71) Applicant: Amphenol Technology (Zhuhai) Co., Ltd., Zhuhai (CN)

(72) Inventors: Rosan Huang, Zhuhai (CN); Rob Weng, Zhuhai (CN); Ricardo Lin, Zhuhai (CN)

(73) Assignee: Amphenol Technology (Zhuhai) Co., Ltd., Zhuhai (CN)

( * ) Notice: Subject to any disclaimer, the term of this patent is extended or adjusted under 35 U.S.C. 154(b) by 423 days.

(21) Appl. No.: 18/197,912

(22) Filed: May 16, 2023

(65) Prior Publication Data

US 2024/0388029 A1 Nov. 21, 2024

(51) Int. Cl.
*H01R 12/91* (2011.01)
*H01R 13/24* (2006.01)

(52) U.S. Cl.
CPC ......... *H01R 12/91* (2013.01); *H01R 13/2471* (2013.01)

(58) Field of Classification Search
CPC .. H01R 12/91; H01R 13/2471; H01R 13/187; H01R 12/73
See application file for complete search history.

(56) References Cited

U.S. PATENT DOCUMENTS

| | | | | |
|---|---|---|---|---|
| 6,558,177 | B2 * | 5/2003 | Havener | H01R 24/50 439/246 |
| 6,776,668 | B1 * | 8/2004 | Scyoc | H01R 24/50 439/700 |
| 8,251,725 | B2 * | 8/2012 | Kasparian | H01R 13/187 439/252 |
| 10,910,778 | B2 * | 2/2021 | Ni | H01R 24/50 |
| 11,183,785 | B2 * | 11/2021 | Cha | H01R 12/91 |

FOREIGN PATENT DOCUMENTS

| | | |
|---|---|---|
| CN | 105390845 | 3/2016 |

* cited by examiner

*Primary Examiner* — Briggitte R. Hammond
(74) *Attorney, Agent, or Firm* — Leason Ellis LLP

(57) ABSTRACT

A floating connector includes a connection body, a contact body, a first cover plate and a first elastic member. The connection body is provided with a floating hole, the contact body is arranged in the floating hole, a floating gap is formed between an outer side wall of the contact body and an inner side wall of the floating hole. The first cover plate is connected to an outer side wall of the contact body and is located at one side of the connection body. One side of the first elastic member abuts against the connection body and the other side thereof abuts against the first cover plate. The connection body, the contact body, the first cover plate and the first elastic member are all made of a conductive material.

12 Claims, 10 Drawing Sheets

FLOATING CONNECTOR

TECHNICAL FIELD

The disclosure relates to conductive connection devices, in particular to a floating connector.

BACKGROUND

In the field of board-to-board connectors, due to tolerance accumulation caused by a plurality of connectors used in assembly of different circuit boards/conductive copper bars and thermal expansion and contraction generated by joule heat during use, relative positions of two boards will deviate, thus affecting assembly and normal work of electrical connectors. Therefore, floating connectors are being used for board-to-board connection.

When an existing floating connector is subjected to shocking, vibration or misalignment mating, a first cover plate slides and floats relative to a connection body, which sometimes causes the first cover plate and the connection body to be completely out of contact, resulting in microsecond-level or longer power failure, and thus failure of the connector. In some cases, the floating connector cannot provide a stable floating force, resulting in unstable force during installation and thus inconvenience for installation. In other cases, the floating connector cannot provide a low contact resistance, which may generate excessive Joule heat.

SUMMARY

The disclosure aims to solve at least one of the technical problems in the existing technology. Therefore, the disclosure provides a floating connector, through which the first cover plate and the connection body can be electrically connected all the time to ensure that the connector will not fail after being subjected to shocking, vibration or misalignment mating.

The floating connector according to the embodiments of the disclosure includes a connection body, a contact body, a first cover plate and a first elastic member, wherein the connection body is provided with a floating hole and is configured for being externally connected to a first external object, the contact body is arranged in the floating hole, a floating gap is formed between an outer side wall of the contact body and an inner side wall of the floating hole, and the contact body is configured for being externally connected to a second external object. The contact body further includes a boss embedded into the outer side wall of the contact body; and a cover, configured for picking up and/or placing a product in a soldering process, the cover has a latch structure, and the cover is latched with the boss through the latch structure. The first cover plate is connected to the outer side wall of the contact body and located at one side of the connection body, and along an axial direction of the floating hole, a projection of the first cover plate onto the connection body at least partially overlaps with the connection body. One side of the first elastic member abuts against the connection body and the other side thereof abuts against the first cover plate. The connection body, the contact body, the first cover plate and the first elastic member are all made of a conductive material.

The floating connector according to the embodiments of the disclosure at least has the following beneficial effects. By forming the floating gap, the connection body and the contact body can move relative to each other. The first elastic member connects the first cover plate and the connection body (the first cover plate and the contact body are connected), so that the contact body can slide and float relative to the connection body, the contact body and the first cover plate are connected together all the time through the first elastic member. The connection body, the contact body, the first cover plate and the first elastic member are all made of the conductive material, so that when the first and second objects generate relative displacement due to that the floating connector is subjected to shocking, vibration or misalignment mating, it can be ensured that the first and second objects are electrically connected together through the floating connector provided by the disclosure without power failure.

According to some embodiments of the disclosure, the floating connector further comprises a second cover plate, wherein the second cover plate is connected to the outer side wall of the contact body and is located at the other side of the connection body, and along the axial direction of the floating hole, a projection of the second cover plate onto the connection body at least partially overlaps with the connection body.

According to some embodiments of the disclosure, the floating connector further comprises a second elastic member, wherein one side of the second elastic member abuts against the connection body and the other side of the second elastic member abuts against the second cover plate.

According to some embodiments of the disclosure, the connection body is provided with a plurality of pins, which are fisheye-shaped compliant pins, and the plurality of pins are all configured for plugging into the first external object.

According to some embodiments of the disclosure, the connection body is provided with an annular wall, and the annular wall is configured for plugging into the first external object.

According to some embodiments of the disclosure, a straight knurling structure is arranged on the annular wall.

According to some embodiments of the disclosure, the conductive material is at least one of a copper alloy, steel or an aluminum alloy.

According to some embodiments of the disclosure, the first elastic member is one of a coil spring, a wave spring or an elastic sheet.

According to some embodiments of the disclosure, the connection body is provided with a jack, a contact element is arranged in the jack, the contact element is connected to the contact body, and the contact body is configured for being externally connected to the second external object.

According to some embodiments of the disclosure, wherein the contact element is one of a torsional spring, a crown spring or an elastic sheet.

According to some embodiments of the disclosure, the contact body further comprises:

- a boss embedded into the outer side wall of the contact body; and
- a cover, configured for picking up placing a product in a soldering process, wherein the cover has a latch structure, and the cover is latched with the boss through the latch structure.

According to some embodiments of the disclosure, the connection body is provided with a positioning notch to facilitate coordinated positioning of the plurality of pins and the plugged first external object.

According to some embodiments of the disclosure, the connection body is provided with a positioning notch for facilitating coordinated positioning of the plurality of pins and the plugged first external object.

Additional aspects and advantages of the disclosure will be set forth partially in the following description, which will become apparent in part from the following description, or may be learned from practice of the disclosure.

BRIEF DESCRIPTION OF DRAWINGS

The above and/or additional aspects and advantages of the disclosure will become apparent and easy to understand from the following description of the embodiments in combination with the drawings below, wherein.

Figure 1A:
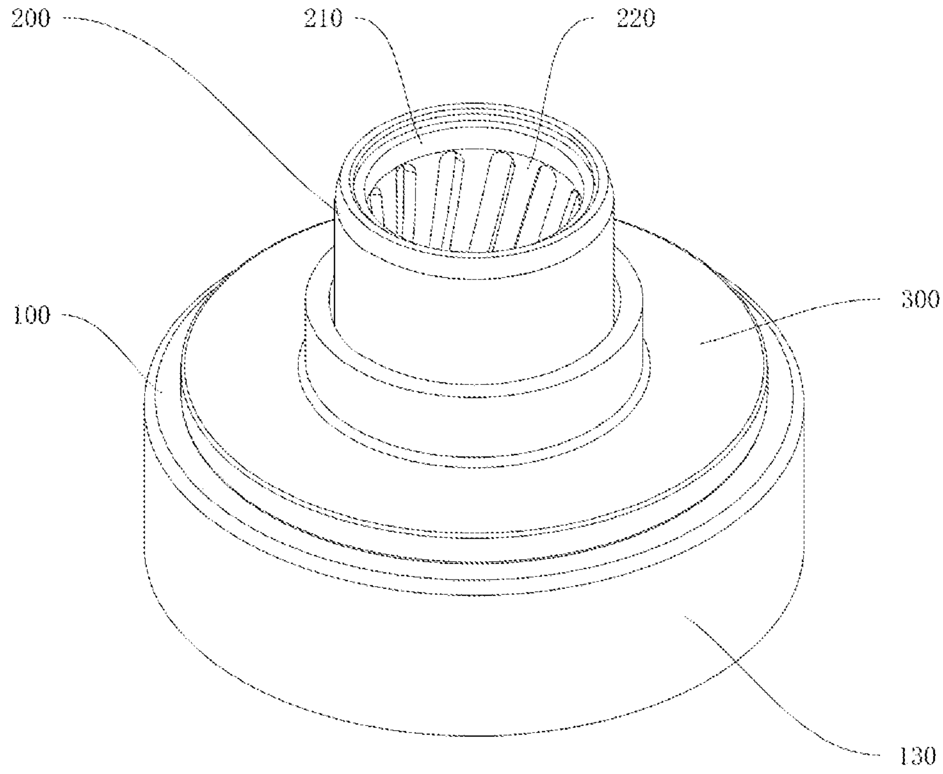
FIG. 1*a* is an overall assembly schematic diagram of a floating connector according to a first embodiment of the disclosure.
Figure 1B:
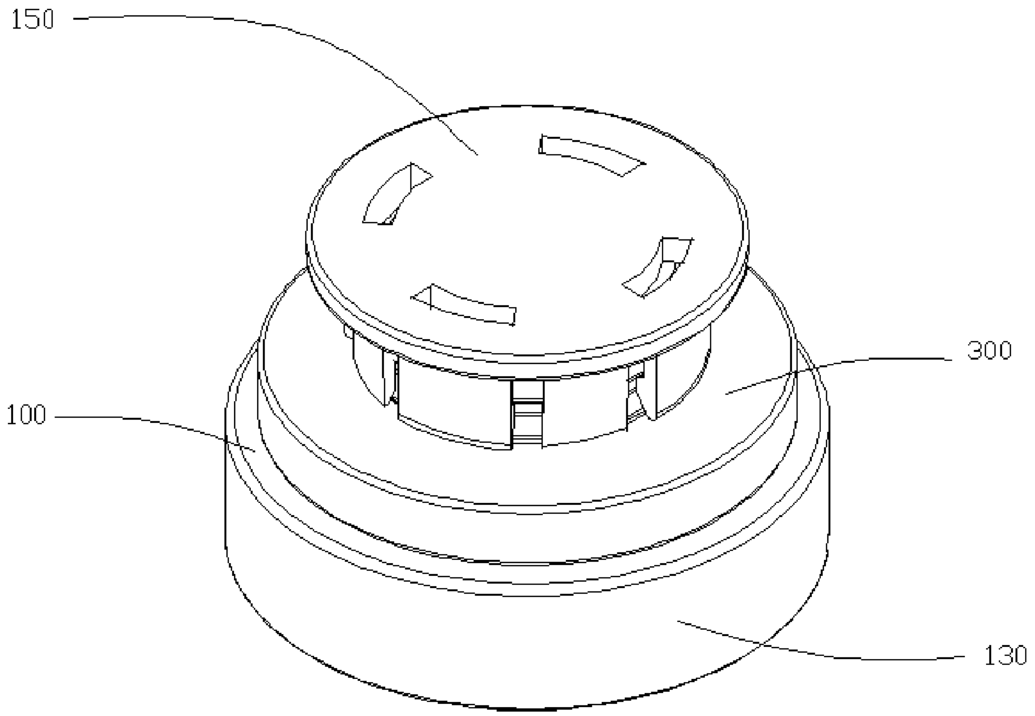
FIG. 1*b* is an overall assembly schematic diagram of a floating connector according to another embodiment of the disclosure.

REFERENCE NUMERALS connection body 100; floating hole 110; pin 120; annular wall 130; straight knurling structure 131; positioning notch 132; first recess 140; cover 150; latch structure 151;

contact body 200; jack 210; contact element 220; boss 230;

first cover plate 300;

first elastic member 400;

second cover plate 500;

first external object 600;

second external object 700.

DETAILED DESCRIPTION

The embodiments of the disclosure are described below in detail. Examples of the embodiments are shown in the accompanying drawings. The same or similar numerals represent the same or similar elements or elements having the same or similar functions throughout the specification. The embodiments described below with reference to the accompanying drawings are exemplary, and are only used to explain the disclosure but should not be construed as a limitation to the disclosure.

In the description of the disclosure, it is to be understood that when referring to orientation description, orientation or position relations indicated by the terms "upper", "lower", "front", "rear", "left", "right", "vertical", "horizontal", "top", "bottom", "tip", "inner", "outer", "axial", "radial", "circumferential", "around" and so forth are orientation or position relations based on the drawings and are only used for convenient description of the disclosure and simplification of the description, rather than indicating or implying that the indicated devices or components must have specific orientations and are configured and operated in the specific orientations. Therefore, it cannot be construed as limitation to the disclosure. In the description of the disclosure, the side wall represents the left side wall and/or the right side wall.

In the description of the disclosure, "a plurality of" means two or more, "greater than", "less than", "exceed" and so forth are construed as exclusion of the following number, and "over", "below", "within" and so forth are construed as inclusion of the following number. The description of "first" and "second", if any, is only for distinguishing between technical features, and should not be interpreted as indicating or implying relative importance or implicitly indicating the number or the sequential relation of technical features indicated.

In the description of the disclosure, it is to be understood that "A is arranged on B" and "B is provided with A" only express the connection relation between A and B and do not mean that A is above B.

In the description of the disclosure, it should be noted that, unless otherwise explicitly specified and defined, the terms "arrange", "mount, "interconnecting" and "connect" should be understood in a broad sense, for example, they may be a fixed connection, a detachable connection, or an integrated connection; may be a mechanical connection, or an electrical connection; and may be a direct connection, or an indirect connection via an intermediate medium, or communication inside two elements. "Bolt connection" and "screw connection" can be equivalently replaced with each other. Those of ordinary skill in the art can understand the specific meanings of the terms in the disclosure under specific circumstances.

As shown in FIG. 1*a* to FIG. 8*b*, a floating connector is provided according to embodiments of the disclosure, which includes a connection body 100, a contact body 200, a first cover plate 300 and a first elastic member 400. The connection body 100 is provided with a floating hole 110 and is configured for being externally connected to a first external object 600. The contact body 200 is arranged in the floating hole 110, a floating gap is formed between an outer side wall of the contact body 200 and an inner side wall of the floating hole 110, the contact body 200 is configured for being externally connected to a second external object 700. The first cover plate 300 is connected to the outer side wall of the contact body 200 and located at one side of the connection body 100. Along the axial direction of the floating hole 110, a projection of the first cover plate 300 onto the connection body 100 at least partially overlaps with the connection body 100. One side of the first elastic member 400 abuts against the connection body 100 and the other side thereof abuts against the first cover plate 300. The connection body 100, the contact body 200, the first cover plate 300 and the first elastic member 400 are all made of a conductive material.

As shown in FIG. 1*a* to FIG. 8*b*, a floating connector is provided according to embodiments of the disclosure, which includes a connection body 100, a contact body 200, a first cover plate 300 and a first elastic member 400. The connection body 100 is provided with a floating hole 110 and is configured for being externally connected to a first external object 600. The contact body 200 is arranged in the floating hole 110, a floating gap is formed between an outer side wall of the contact body 200 and an inner side wall of the floating hole 110, and the contact body 200 is configured for being externally connected to a second external object 700. The contact body 200 further includes a boss 230 embedded into the outer side wall of the contact body 200; and a cover 150, configured for picking up and/or placing a product in a soldering process. The cover further has a latch structure 151. The cover 150 is latched with the boss 230 through the latch structure 151. Since the latch structure 151 is latched with the boss 230, the cover 150 is more stably matched with the contact body 200, so that the structural strength and the reliability of the whole product are enhanced. A pick-up plane of the product is provided in the manufacturing process, and the pick-up plane is at the center of gravity of the product to ensure that the product in the pick-up process is stably stressed and can be stably used in automatic pick-up equipment, so that the product is suitable for automatic production, and the manufacturing cost can be reduced. The first cover plate 300 is connected to the outer side wall of the contact body 200 and located at one side of the connection body 100. Along the axial direction of the floating hole 110, a projection of the first cover plate 300 onto the connection body 100 at least partially overlaps with the connection body 100. One side of the first elastic member 400 abuts against the connection body 100 and the other side thereof abuts against the first cover plate 300. The connection body 100, the contact body 200, the first cover plate 300 and the first elastic member 400 are all made of a conductive material.

The first external object 600 and the second external object 700 are generally circuit boards. Specifically, the connection body 100 is fixed onto the circuit board A by soldering, adhering or plugging and is electrically connected to at least a part of the circuits on the circuit board A. In general, the contact body 200 is movably connected to the circuit board B, and the contact body 200 abuts against the circuit board B all the time (such as by plugging in interference fit), so that the contact body 200 is electrically connected to at least a part of the circuits on the circuit board B. Another expression for "a floating gap is formed between an outer side wall of the contact body 200 and an inner side wall of the floating hole 110" is as follows: a gap is formed between the outer side wall of the contact body 200 and the inner side wall of the floating hole 110, and the contact body 200 is movable in a radial direction of the floating hole 110 relative to the connection body 100. Another expression for "along the axial direction of the floating hole 110 (for projection), a projection of the first cover plate 300 onto the connection body 100 at least partially overlaps with the connection body 100" is as follows: the distance from the outermost edge of the first cover plate 300 to the center of the floating hole 110 is greater than the radius of the floating hole 110. It is to be understood that the connection body 100, the contact body 200, the first cover plate 300 and the first elastic member 400 can be made of either the same conductive material or different conductive materials. For example, the contact body 200, the first cover plate 300 and the first elastic member 400 are all made of steel, and the connection body 100 is made of a copper alloy. It is to be understood that the contact body 200 is relatively limited in the floating hole 110. When the floating connector according to the embodiment is arranged substantially vertically, the second external object 700 presses the contact body 200 under the influence of the gravity, so that the contact body 200 can be in the floating hole 110 all the time without falling. It is to be understood that the first elastic member 400 is arranged, one side of the first cover plate 300 is affected by a downward pressure caused by the gravity of the second external object 700 and the other side thereof is affected by an upward elastic force of the first elastic member 400 (offsetting a part of or all influence of gravity of the second external object 700), so that the first cover plate 300 will not be pressed tightly against the connection body 100 by the second external object 700 which may result in that the first cover plate 300 cannot slide and float relative to the connection body 100 due to excessive frictional resistance between the first cover plate 300 and the connection body 100.

By forming the floating gap, the connection body 100 and the contact body 200 can move relative to each other, and particularly the contact body 200 is displaceable in a radial direction relative to the connection body 100 (along the radial direction of the floating hole 110). The first elastic member 400 is arranged to connect the first cover plate 300 and the connection body 100, so that the connection body 100 and the contact body 200 can move relative to each other, and particularly the contact body 200 is displaceable in an axial direction relative to the connection body 100 (along the axial direction of the floating hole 110). Specifically, with the first cover plate 300 being close to or away from the connection body 100, the distance between the first cover plate 300 and the connection body 100 changes, and the first elastic member 400 can deform therewith (it is to be understood that the first elastic member 400 is in a compressed state all the time to accumulate the clastic force, so that it can release the clastic force at any time to generate clastic deformation). Moreover, regardless of whether the first cover plate 300 and the connection body 100 are the closest (the first cover plate 300 and the connection body 100 directly abut against each other) or the farthest, the deformation of the first elastic member 400 always falls within the range of elastic deformation thereof, so that it is guaranteed that the first elastic member 400 abuts against the first cover plate 300 and the connection body 100 together all the time, and a current can be conducted ("all are made of the conductive material"). Therefore, when the floating connector is subjected to shocking, vibration or misalignment mating and the first external object 600 and the second external object 700 are displaced with respect to each other, the floating connector can guarantee that the first external object 600 and the second external object 700 are electrically connected together all the time (there exists at least one conductive line: the first external object 600—the connection body 100—the first elastic member 400—the first cover plate 300—the contact body 200—the second external object 700) without power failure.

Figure 3A:
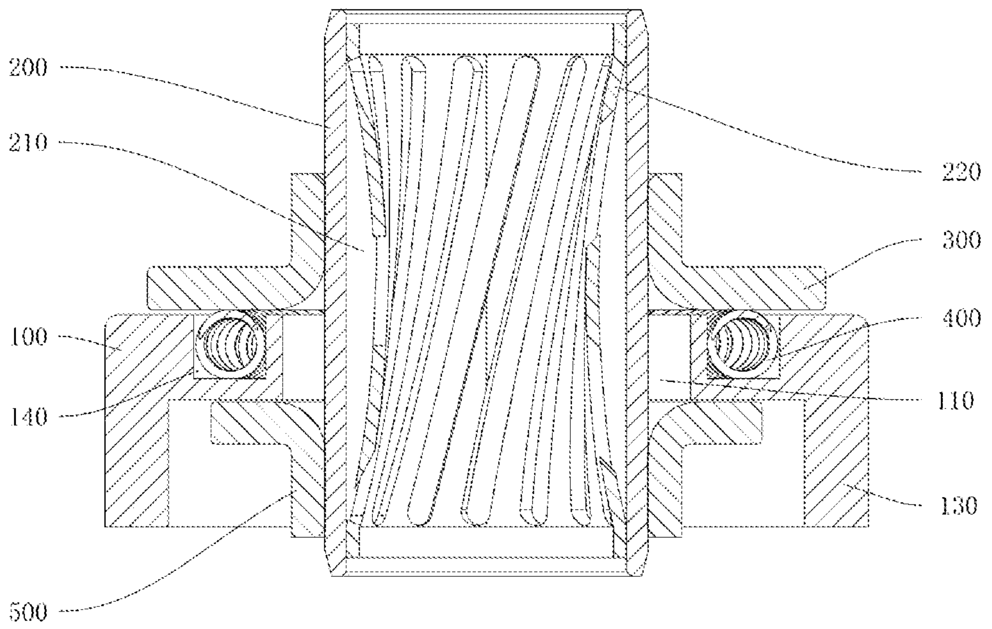
FIG. 3*a* is a cross-sectional view of the floating connector shown in FIG. 1*a*.
Figure 3B:
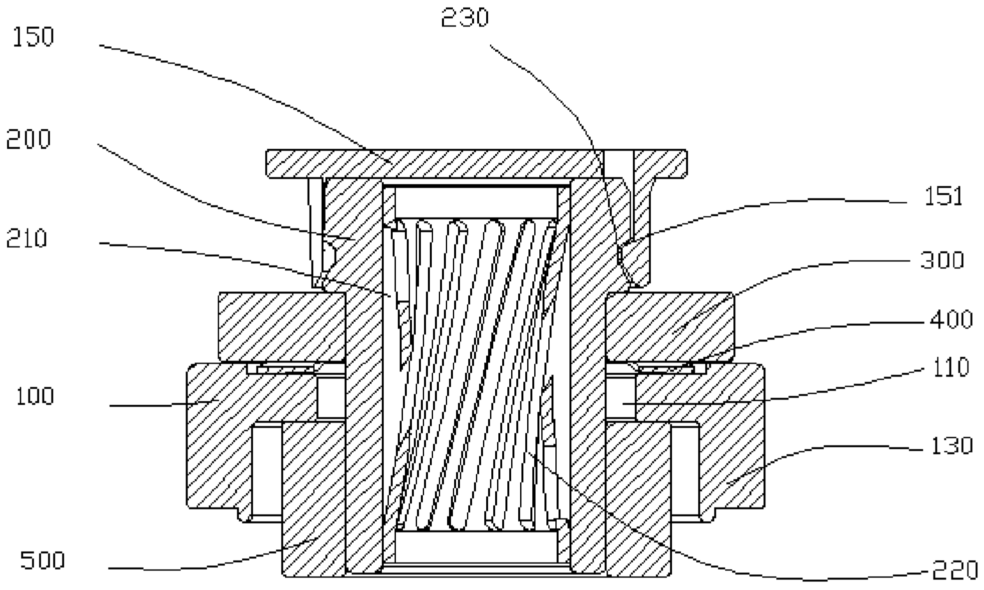
FIG. 3*b* is a cross-sectional view of the floating connector shown in FIG. 1*b*.
Figure 6:
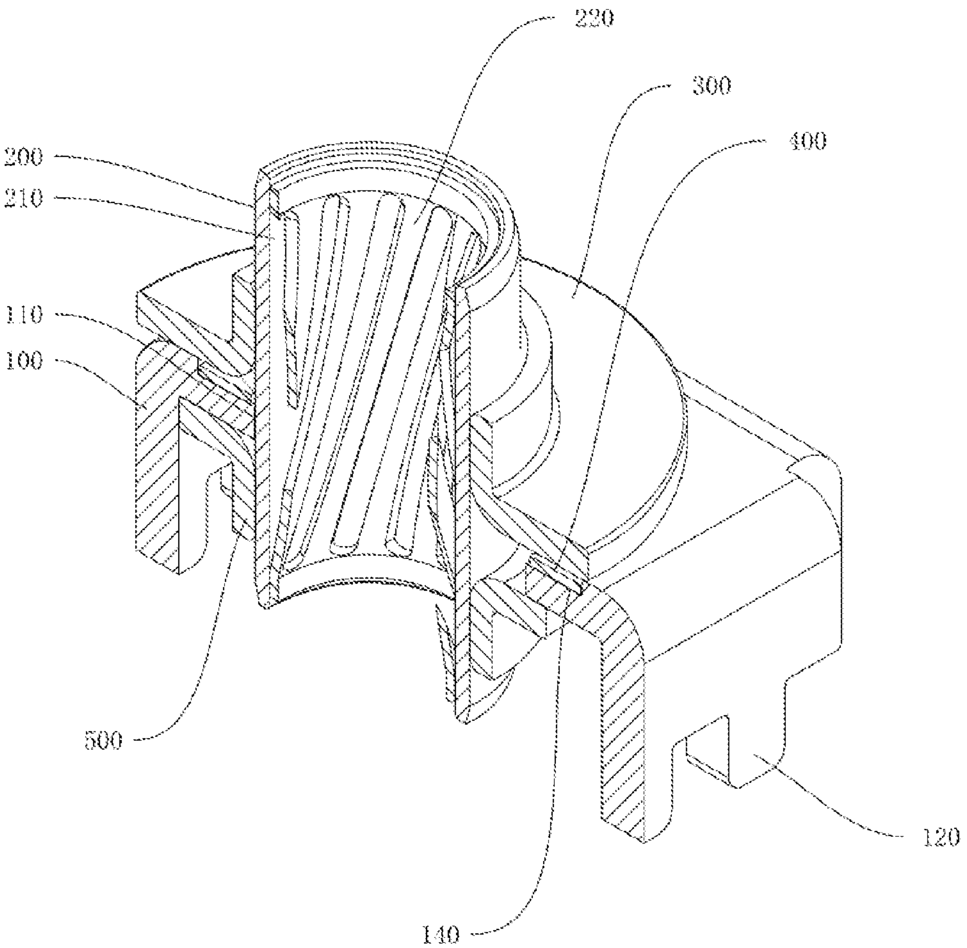
FIG. 6 is an axonometric sectional view of the floating connector shown in FIG. 5*a*.

As shown in FIG. 3*a*, FIG. 3*b* and FIG. 6, in some embodiments of the disclosure, the floating connector further includes a second cover plate 500, wherein the second cover plate 500 is connected to the outer side wall of the contact body 200 and located at the other side of the connection body 100. Along the axial direction of the floating hole 110, a projection of the second cover plate 500 onto the connection body 100 at least partially overlaps with the connection body 100.

The first cover plate 300 is located at one side of the connection body 100, the second cover plate 500 is located at the other side of the connection body 100, and the first cover plate 300 and the second cover plate 500 are both connected to the outer side wall of the contact body 200. Therefore, the first cover plate 300, the contact body 200 and the second cover plate 500 are fixedly connected to form a structure with a substantial I-shaped section, and the connection body 100 is located in left and right notches of the I-shaped structure and blocked by the first cover plate 300 and the second cover plate 500. By arranging the second cover plate 500, the I-shaped structure formed by the first cover plate 300, the contact body 200 and the second cover plate 500 is limited in the floating hole 110 of the connection body 100. The floating connector is more stable after being assembled and will not be split randomly. Moreover, the floating connector can be placed and connected randomly (not limited to vertical arrangement). In this case, the first elastic member 400 is arranged to push the I-shaped structure to one side of the connection body 100, so that the second cover plate 500 can abut against the connection body 100, and a certain frictional resistance is generated between the second cover plate 500 and the connection body 100. The second cover plate 500 (i.e., the I-shaped structure) cannot slide and float relative to the connection body 100, i.e., the first external object 600 and the second external object 700 are connected through the floating connector according to the embodiment of the disclosure. The first external object 600 and the second external object 700 will not move randomly without other external forces. It is to be understood that the second cover plate 500 can also be made of the conductive material.

As shown in FIG. 6, in some embodiments of the disclosure, the floating connector further includes a second elastic member (not shown in the drawings), one side of the second elastic member abuts against the connection body 100 and the other side thereof abuts against the second cover plate 500.

Similar to the first elastic member 400, the second elastic member is arranged to balance the influence of the elastic force (or further including gravity) of the first elastic member 400 on the I-shaped structure, so that both the first cover plate 300 and the second cover plate 500 will not tightly abut against the connection body 100 without other external forces, preventing excessive frictional resistance between the two and the connection body 100 and preventing the I-shaped structure from sliding and floating relative to the connection body 100. Furthermore, a certain pre-tightening force can be applied to generate a certain frictional resistance between the two and the connection body 100, preventing the I-shaped structure from sliding randomly relative to the connection body 100 and swinging. Moreover, the two can be separated from the connection body 100 to a certain extent by the first elastic member 400 and the second elastic member and abut against the two instead of the connection body 100, so that the contact area can be reduced, facilitating sliding of the I-shaped structure. It is to be understood that the second elastic member can also be made of the conductive material.

As shown in FIG. 3*b*, in some embodiments of the disclosure, the floating connector further includes the cover 150 arranged on the contact body 200, wherein the cover 150 has the latch structure 151. The boss 230 is arranged on the side wall of the contact body 200 and embedded into the side wall of the contact body 200. The cover 150 is configured for picking up and/or placing the product in the soldering process, and the cover 150 is latched with the boss 230 through the latch structure 151. With the technical effect of the two latched with each other, the product can use the cover 150 as needed. When the cover 150 is used, the cover is latched with the boss 230 through the latch structure 151, and the cover 150 is more tightly matched with the contact body.

Figure 5A:
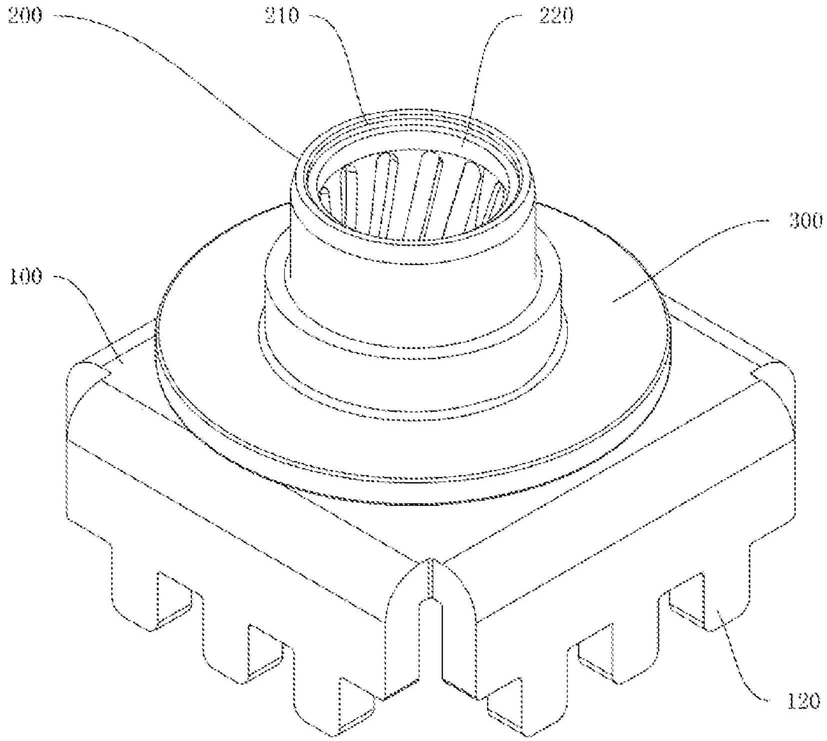
FIG. 5*a* is an overall assembly schematic diagram of a floating connector according to yet another embodiment of the disclosure.
Figure 5B:
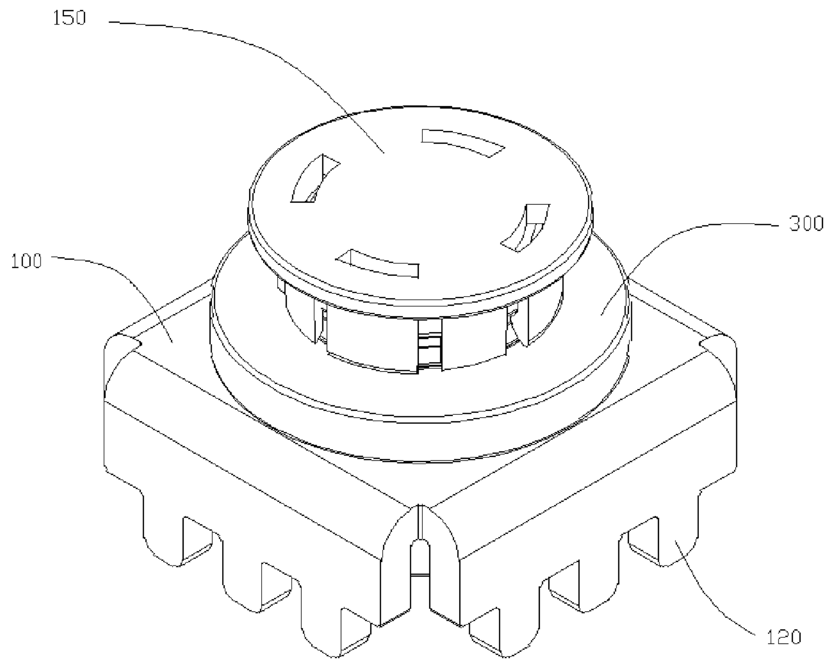
FIG. 5*b* is an overall assembly schematic diagram of a floating connector according to yet another embodiment of the disclosure.

As shown in FIG. 5*a* and FIG. 5*b*, in some embodiments of the disclosure, the connection body 100 is provided with a plurality of pins 120, the plurality of pins 120 are all configured for plugging into the object, and the pin 120 are usually arranged below the connection body 100. The connection body 100 is plugged into the first external object 600 (circuit board) through the plurality of pins 120 (corresponding slots are formed in the first external object 600). With a plurality of connection point locations, not only the stability of structural connection is ensured, but also the reliability of electrical connection is guaranteed. It is to be understood that the connection body can be fixed by interference fit or snap fit between the pins 120 and the first external object 600, and can further be fixed by soldering or adhering at the plugging connection positions. It is to be understood that the connection body 100 may not be provided with a connection structure, and the connection body 100 can be directly fixed to the first external object 600 by soldering, adhering or the like. FIG. 5*a* shows the floating connector without the cover 150 and FIG. 5*b* shows the floating connector with the cover 150.

Figure 5C:
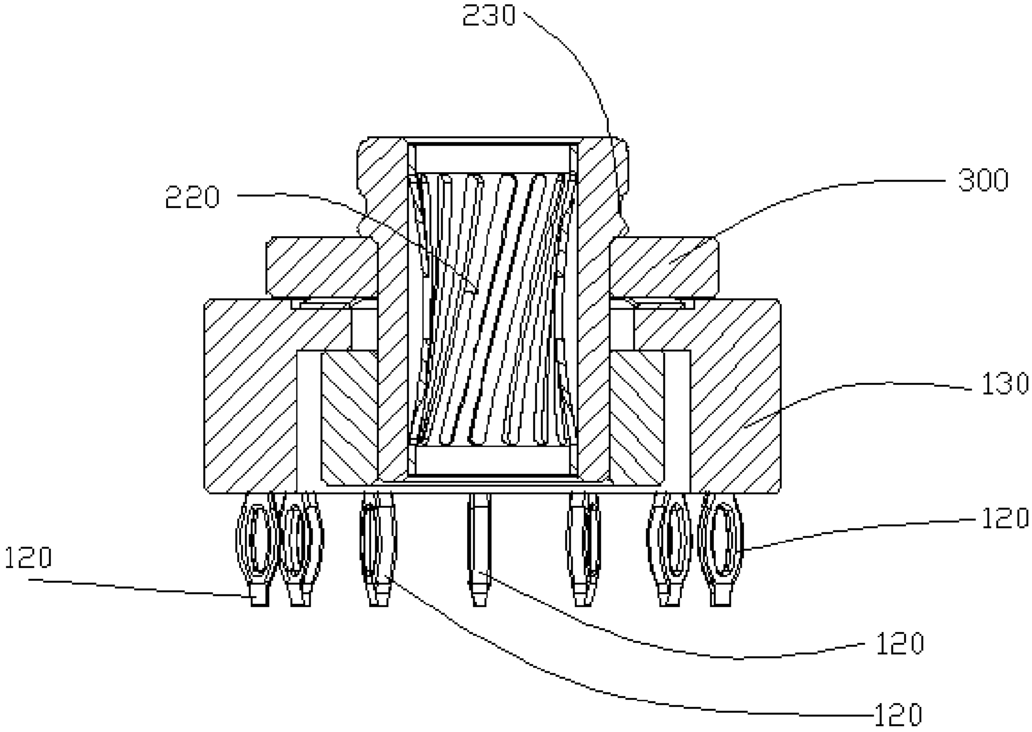
FIG. 5*c* is a cross-sectional view of a floating connector with fisheye-shaped compliant pins according to yet another embodiment of the disclosure.
Figure 5D:
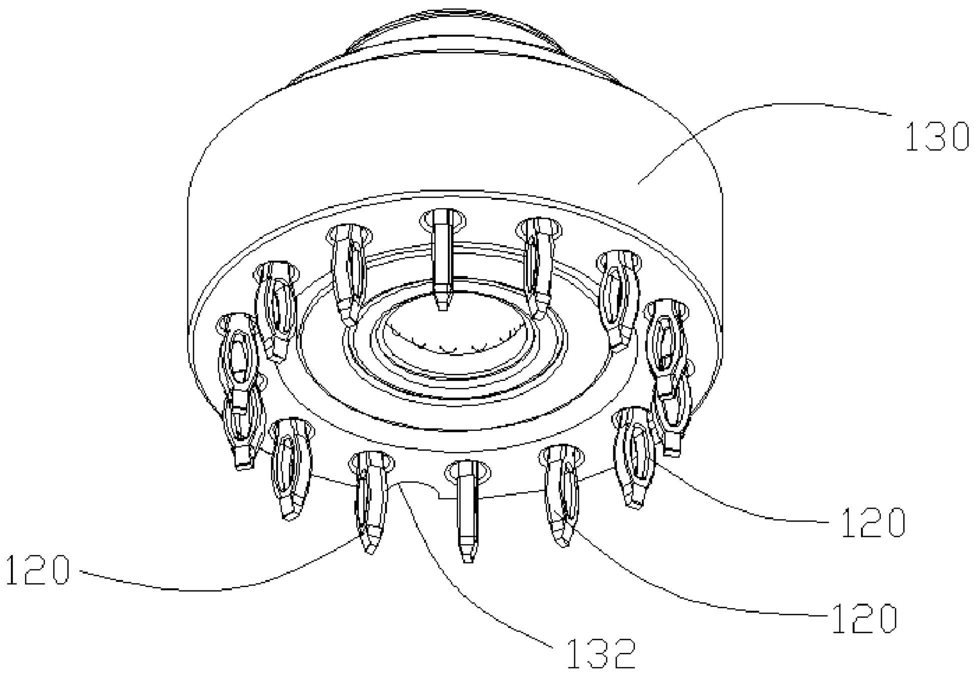
FIG. 5*d* is an overall assembly schematic diagram of a floating connector with fisheye-shaped compliant pins according to yet another embodiment of the disclosure.

As shown in FIG. 5*c* and FIG. 5*d*, in some embodiments of the disclosure, the connection body 100 is provided with the plurality of pins 120, the pins 120 may be fisheye-shaped compliant pins, the plurality of pins 120 are all configured for plugging into the first external object 600, and fisheyes are suitable for press-fitting the product on the PCB. Compared with SMT style and PIP style, the fisheye style has the advantage that the PCB does not need reflow soldering at a high temperature, the process is simple, and the high-temperature process is neither needed for subsequent replacement and maintenance. The fisheye-shaped compliant pins are simple to process and easy to maintain. The fisheye style, the knurling style and the pressed style are all suitable for press fitting. The fisheye style is generally suitable for press fitting on the PCB and the knurling style is generally suitable for press fitting on a BUSBAR (copper bar). The connection body is provided with a positioning notch to facilitate coordinated positioning of the plurality of pins and the plugged first external object 600.

As shown in FIG. 1*a*, FIG. 1*b*, FIG. 2*a* and FIG. 2*b*, in some embodiments of the disclosure, the connection body 100 is provided with an annular wall 130, and the annular wall 130 is configured for plugging into the first external object 600.

The annular wall 130 is generally arranged below the connection body 100, the annular wall 130 is plugged into the first external object 600 (a corresponding jack is formed on the first external object 600), has a large contact area with the first external object 600, and is good in conductive performance. The whole annular wall 130 can be electrically connected for the convenience of wiring.

Figure 4:
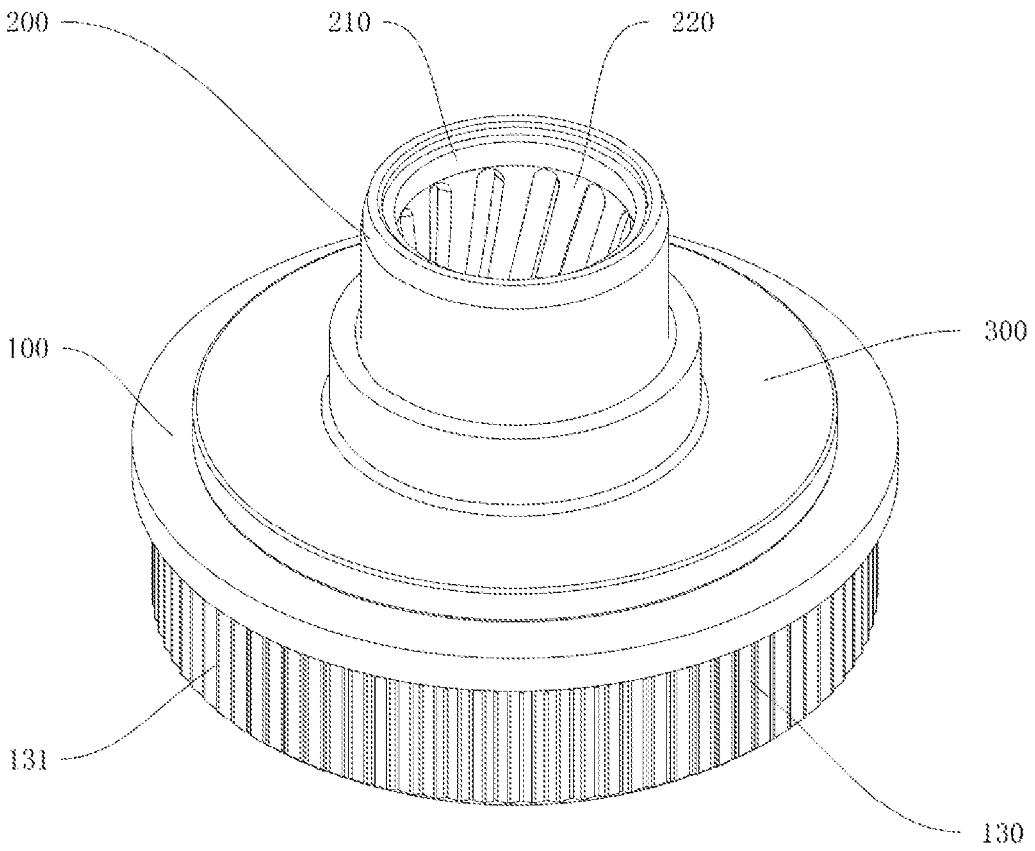
FIG. 4 is an overall assembly schematic diagram of a floating connector according to yet another embodiment of the disclosure.

As shown in FIG. 4, in some embodiments of the disclosure, a straight knurling structure 131 is arranged on a side wall of the annular wall 130.

Knurling, referring to "knurling" in Baidu Baike, refers to a method of forming a straight pattern or a reticulate pattern by rolling on the surface of a workpiece by using a knurling tool, wherein the knurling tool consists of a roller and a tool body and is divided into a straight pattern knurling tool and a reticulate pattern knurling tool according to pattern. The structure machined by using the straight pattern knurled tool is the straight knurling structure 131. By arranging the straight knurling structure 131, after the annular wall 130 is plugged into the first external object 600, the floating connector will not rotate randomly, facilitating further assembly and machining. It is to be understood that the straight knurling structure 131 is arranged on at least one surface of the inner side wall and the outer side wall of the annular wall 130.

As shown in FIG. 1*a*, FIG. 1*b*, FIG. 2*a* and FIG. 2*b*, in some embodiments of the disclosure, the conductive material is at least one of a copper alloy, steel or an aluminum alloy.

Referring to the above content, different parts of the floating connector may be made of different conductive materials and may be selected according to conductivity, thermal conductivity, material strength and material toughness of different materials. For example, the first elastic member 400 and the second elastic member may be made of a material with high toughness (steel). The connection body 100, the first cover plate 300, the contact body 200 and the second cover plate 500 may be made of a material with good conductivity (copper alloy) as they are primary circulation lines of current in the normal state.

Figure 2A:
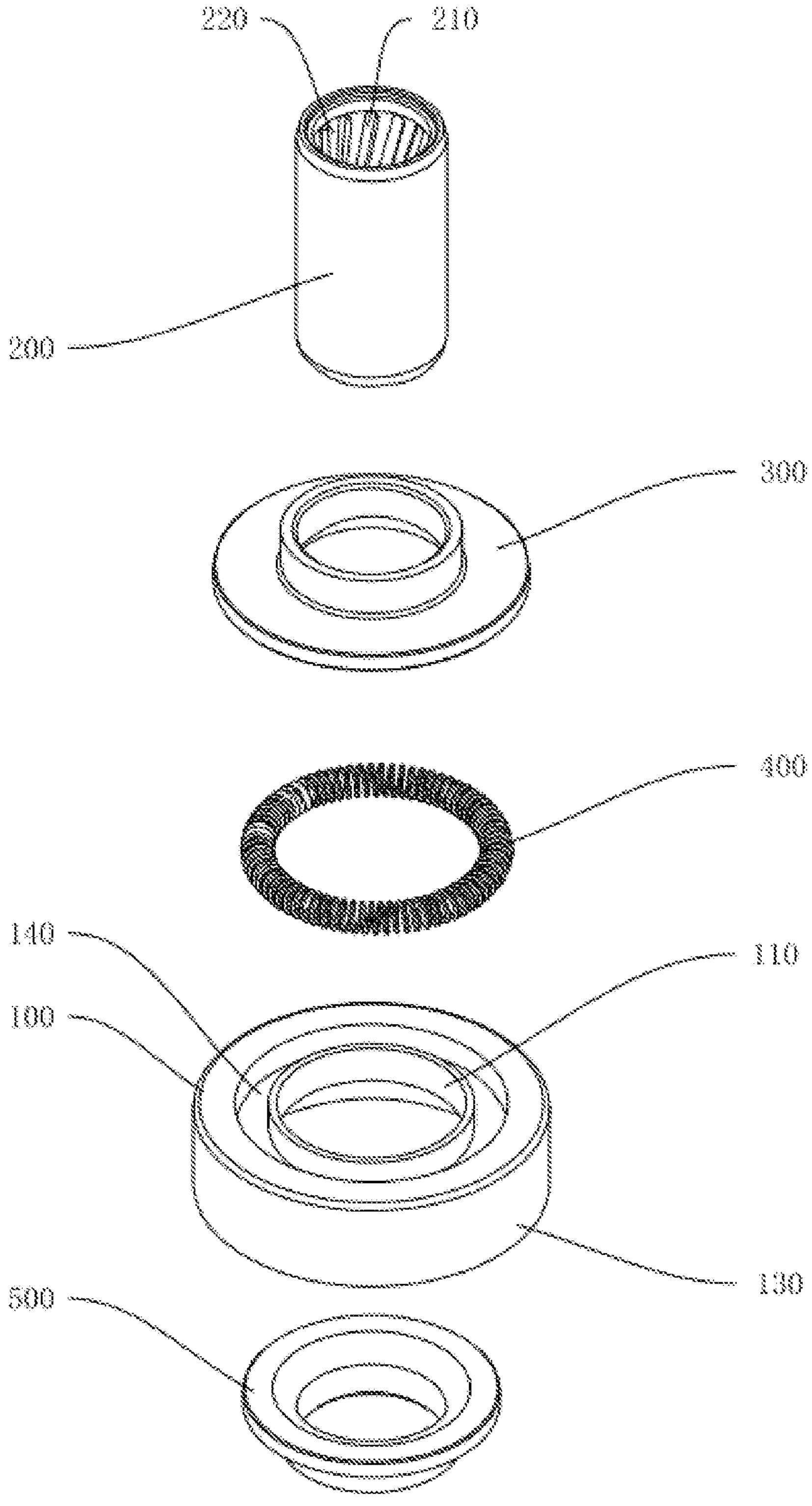
FIG. 2*a* is an exploded view of the floating connector shown in FIG. 1*a*.
Figure 2B:
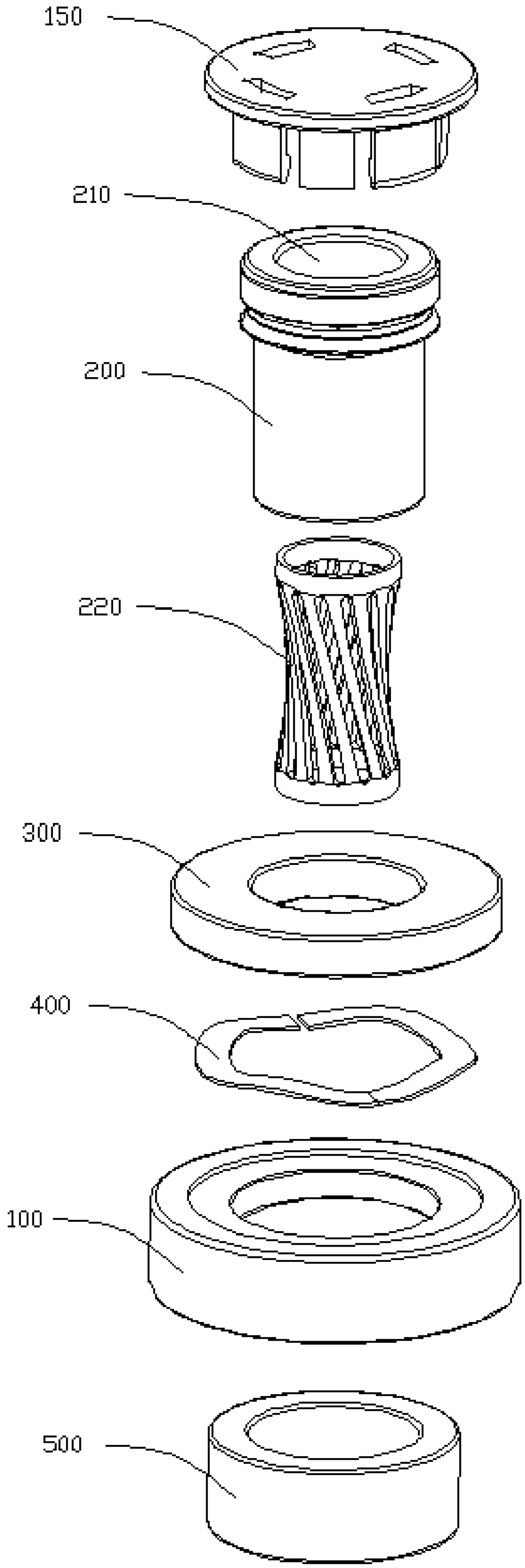
FIG. 2*b* is an exploded view of the floating connector shown in FIG. 1*b*.
Figure 7:
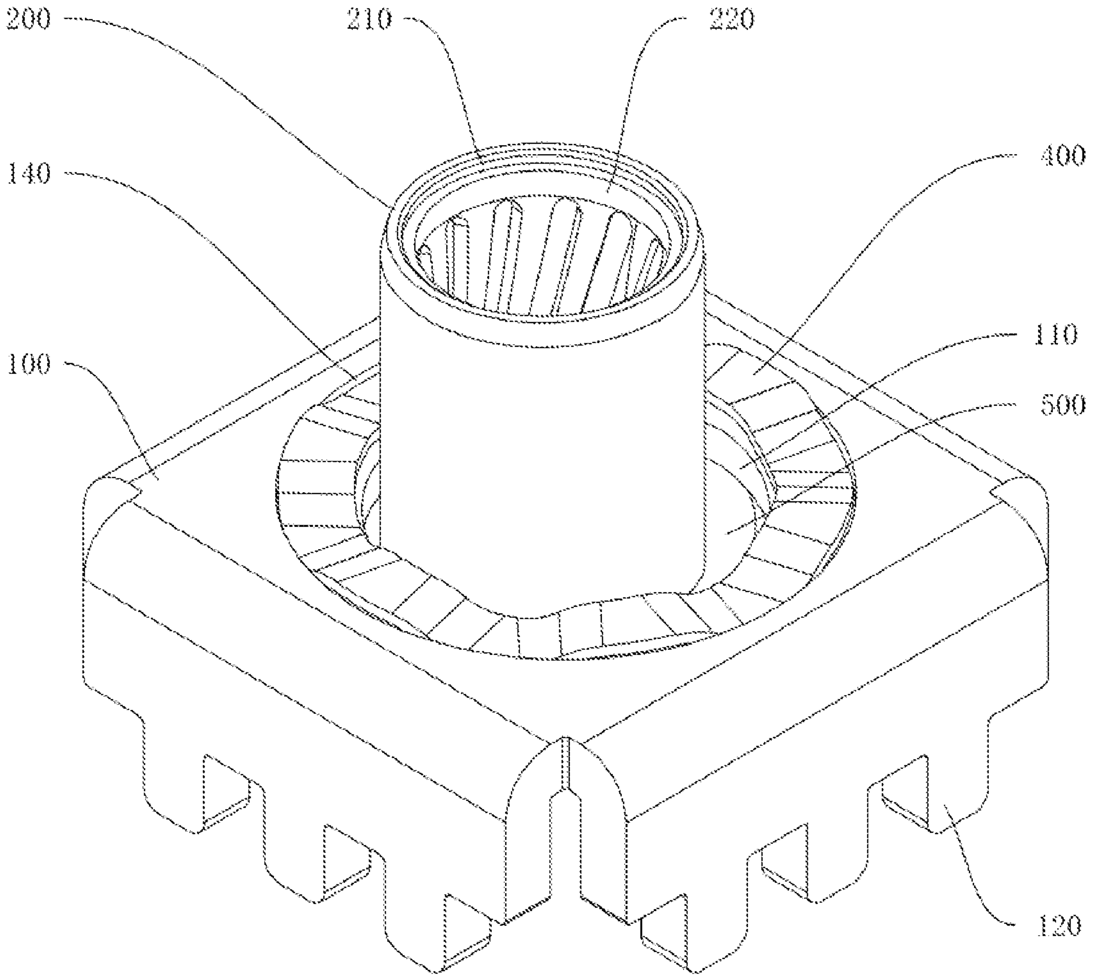
FIG. 7 is an overall assembly schematic diagram of the floating connector shown in FIG. 5*a* without the first cover plate.
Figure 8A:
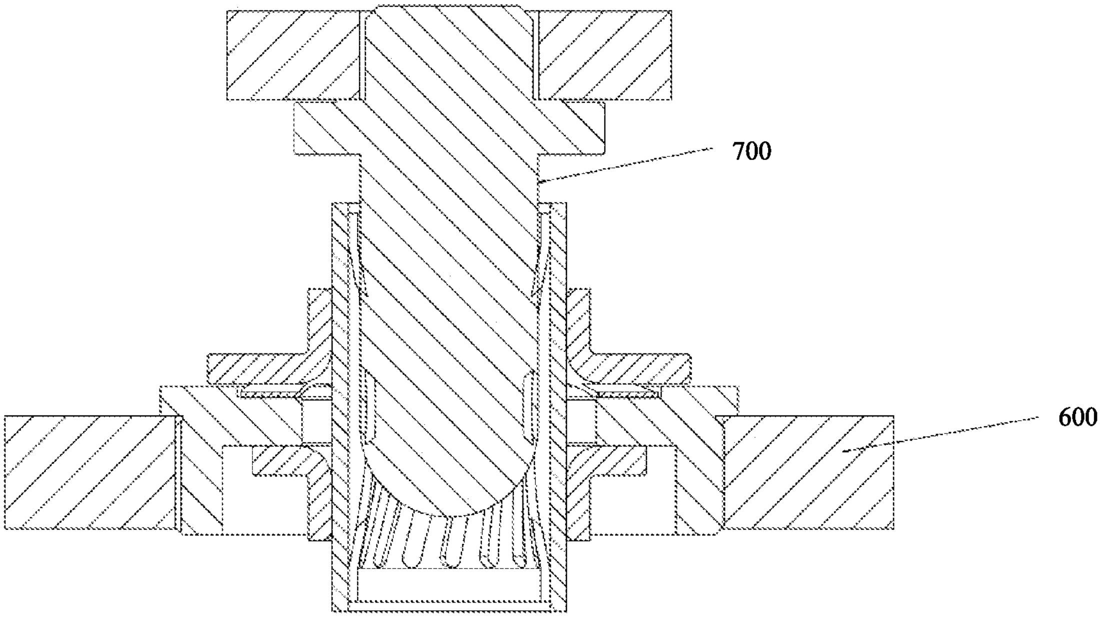
FIG. 8*a* is a schematic diagram showing connection of the floating connector of the disclosure with a first external object and a second external object, wherein no misalignment mating occurs.
Figure 8B:
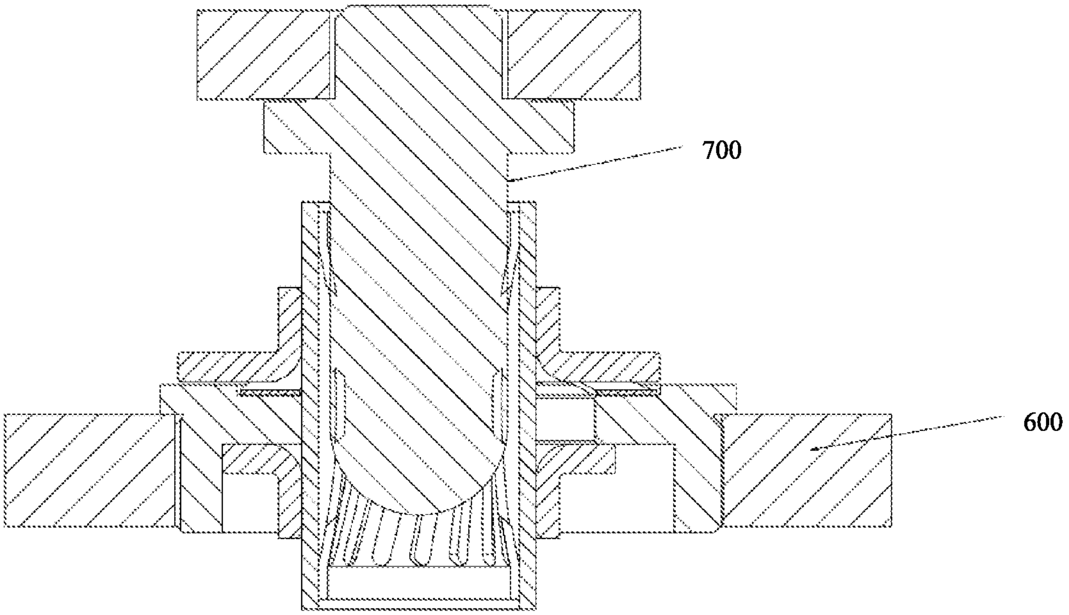
FIG. 8*b* is another schematic diagram showing connection of the floating connector of the disclosure with a first external object and a second external object, wherein misalignment mating occurs.

As shown in FIG. 2*a*, FIG. 2*b* and FIG. 7, in some embodiments of the disclosure, the first clastic member 400 is one of a coil spring, a wave spring or an elastic sheet.

The coil spring, a common spring in life, is a spring spirally expanded. The coil spring is easy to purchase and convenient to replace and maintain. The wave spring, referring to "wave spring" in Baidu Baike, is an elastic member with a plurality of peaks and valleys on a thin metal ring. The wave spring occupies a small space and can bear a large pressure in the axial direction of the floating hole 110. The elastic sheet, an elastic sheet body, which is usually folded (Z-shaped and the like), is a common part in the mechanical field. In the disclosure, for example, the first clastic member 400 is the elastic sheet, and a plurality of elastic sheets are arranged. A plurality of elastic sheets are assembled in the floating connector, and the connector is hard to fail completely and has a long service life.

It is to be understood that the first elastic member 400 is naturally limited between the connection body 100 and the first cover plate 300. The first elastic member 400 and the connection body 100 are generally in an abutting relation (under a special circumstance, the first elastic member 400 is fixed onto the connection body 100), and the connecting relation between the first clastic member 400 and the first cover plate 300 is similar. It is to be further understood that at least one of the connection body 100 and the first cover plate 300 is provided with a first recess 140, the first recess 140 is configured for placing the first elastic member 400 so as to limit the first elastic member 400, i.e., the first clastic member 400 is enveloped and defined in an unclosed space by the connection body 100 and the upper cover plate, the second elastic member is arranged in a similar way.

As shown in FIG. 1*a*, FIG. 1*b*, FIG. 3*a* and FIG. 3*b*, in some embodiments of the disclosure, the contact body 200 is provided with a jack 210, the contact element 220 is arranged inside the jack 210, the contact element 220 is connected to the contact body 200, and the contact body 200 is configured for being externally connected to the second external object 700.

The contact element 220 and the contact body 200 may be either fixedly connected by soldering, adhering or the like or movably connected together through snap-fit connection, limited connection and the like. The contact element 220 and the contact body 200 abut against each other all the time, so that the normal conductive function of the floating connector is guaranteed. The jack 210 is configured for plugging a plugging column of the second external object 700. When the plugging column of the second external object 700 is plugged into the jack 210, the plugging column abuts against the contact element 220, so that the conductive function is achieved. It is to be understood that the contact element 220 is generally made of the conductive material.

As shown in FIG. 1*a*, FIG. 2*b*, FIG. 3*b* and FIG. 5*b*, in some embodiments of the disclosure, the floating connector further has a cover 150, and the cover 150 may be matched with the contact body 200 through movable connection or fixed connection.

Figure 5E:
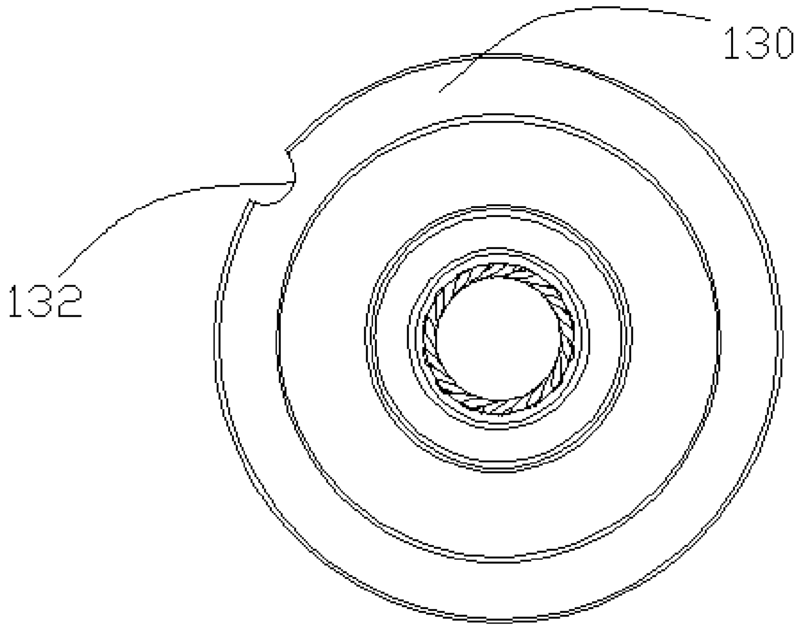
FIG. 5*e* is a top view of FIG. 5*c*.

As shown in FIG. 5*a*, FIG. 5*c* and FIG. 6, in some embodiments of the disclosure, the contact element 220 is one of a torsional spring, a crown spring or an elastic sheet. As shown in FIG. 5*c*, FIG. 5*e* is a top view of FIG. 5*c*.

Referring to "torsional spring" in Baidu Baike, the end of the torsional spring is fixed to other assemblies. When the other assemblies rotate around the spring, the spring pulls them back to initial positions so as to generate a torque or a rotating force. With respective to the crown spring, reference may be made to a patent document "Crown spring" with publication No. CN105390845B. A jack of the crown spring is generally formed for the convenience of plugging into the second external object 700. When the contact element 220 is the elastic member, it is generally a cantilever type elastic sheet. One end of the cantilever type elastic sheet is fixedly connected to the contact body 200 (the inner side wall of the plugging eye 210) and the other end thereof is a cantilever type structure for abutting against the second external object 700. The torsional spring, the crown spring and the elastic sheet are arranged to form interference fit between the contact element 220 and the second external object 700 after the second external object 700 is plugged into the jack 210, i.e., after the second external object 700 is plugged into the jack 210, the contact element 220 will deform elastically. Under the action of the elastic force of the contact element 220, a part of the contact element 220 will tightly abut against the second external object 700, so that the contact element 220 and the second external object 700 can abut against each other all the time, thereby guaranteeing the normal conductive function of the floating connector.

Detailed description has been made on the embodiments of the disclosure in combination of the accompanying drawings. But the disclosure is not limited to the abovementioned embodiments. Various variations may be made without departing from the purpose of the disclosure within the scope of knowledge of those of ordinary skill in the art.

What is claimed is:

1. A floating connector, comprising:

a connection body, provided with a floating hole and configured for being externally connected to a first external object;

a contact body, arranged in the floating hole, wherein a floating gap is formed between an outer side wall of the contact body and an inner side wall of the floating hole, and the contact body is configured for being externally connected to a second external object;

a first cover plate, connected to the outer side wall of the contact body, wherein the first cover plate is located at one side of the connection body, and along an axial direction of the floating hole, a projection of the first cover plate onto the connection body at least partially overlaps with the connection body; and a first elastic member, wherein one side of the first elastic member abuts against the connection body and the other side of the first elastic member abuts against the first cover plate, and the connection body, the contact body, the first cover plate and the first elastic member are all made of a conductive material.

2. The floating connector according to claim 1, further comprising a second cover plate, wherein the second cover plate is connected to the outer side wall of the contact body and is located at the other side of the connection body, and along the axial direction of the floating hole, a projection of the second cover plate onto the connection body at least partially overlaps with the connection body.

3. The floating connector according to claim 2, further comprising a second elastic member, wherein one side of the second elastic member abuts against the connection body and the other side of the second elastic member abuts against the second cover plate.

4. The floating connector according to claim 1, wherein the connection body is provided with a plurality of pins, which are fisheye-shaped compliant pins, and the plurality of pins are all configured for plugging into the first external object.

5. The floating connector according to claim 1, wherein the connection body is provided with an annular wall, and the annular wall is configured for plugging into the first external object.

6. The floating connector according to claim 5, wherein a straight knurling structure is arranged on the annular wall.

7. The floating connector according to claim 1, wherein the conductive material is at least one of a copper alloy, steel or an aluminum alloy.

8. The floating connector according to claim 1, wherein the first elastic member is one of a coil spring, a wave spring or an elastic sheet.

9. The floating connector according to claim 1, wherein the connection body is provided with a jack, a contact element is arranged in the jack, the contact element is connected to the contact body, and the contact body is configured for being externally connected to the second external object.

10. The floating connector according to claim 9, wherein the contact element is one of a torsional spring, a crown spring or an elastic sheet.

11. The floating connector according to claim 1, wherein the contact body further comprises:

a boss embedded into the outer side wall of the contact body; and a cover, configured for picking up and/or placing a product in a soldering process, wherein the cover has a latch structure, and the cover is latched with the boss through the latch structure.

12. The floating connector according to claim 4, wherein the connection body is provided with a positioning notch to facilitate coordinated positioning of the plurality of pins and the plugged first external object.

* * * * *